US010287731B2

(12) United States Patent
Butterfield et al.

(10) Patent No.: US 10,287,731 B2
(45) Date of Patent: May 14, 2019

(54) ABRASION-RESISTANT RUBBER ROLL COVER WITH POLYURETHANE COATING

(75) Inventors: William S. Butterfield, Stevens City, VA (US); Dilip De, Stephens City, VA (US); Balaji Srinivasan, Winchester, VA (US); Gary Kilbourne, Landenburg, PA (US)

(73) Assignee: Stowe Woodward Licensco LLC, Youngsville, NC (US)

( * ) Notice: Subject to any disclaimer, the term of this patent is extended or adjusted under 35 U.S.C. 154(b) by 4390 days.

(21) Appl. No.: 11/269,469

(22) Filed: Nov. 8, 2005

(65) Prior Publication Data

US 2007/0111871 A1 May 17, 2007

(51) Int. Cl.

| | |
|---|---|
| ***F16C 13/00*** | (2006.01) |
| ***D21F 3/08*** | (2006.01) |
| ***D21G 1/02*** | (2006.01) |

(52) U.S. Cl.

CPC ............. *D21F 3/08* (2013.01); *D21G 1/0233* (2013.01); *B31F 2201/073* (2013.01); *B41N 2207/02* (2013.01); *B41N 2207/04* (2013.01); *B65H 2404/18* (2013.01)

(58) Field of Classification Search

USPC ......................................... 492/48, 49, 53, 56

See application file for complete search history.

(56) References Cited

U.S. PATENT DOCUMENTS

| | | | |
|---|---|---|---|
| 112,988 | A | 3/1871 | Towers |
| 1,384,806 | A | 7/1921 | Reed |
| 1,456,458 | A | 5/1923 | Nordell |
| 1,993,718 | A | 3/1935 | Miner |
| 2,178,421 | A | 10/1939 | Freedlander |
| 2,597,858 | A | 5/1952 | Freedlander |
| 2,997,406 | A | 8/1961 | Freeman et al. |
| 3,184,828 | A | 5/1965 | Dames, Jr. |
| 3,445,906 | A | 5/1969 | Mitchell |
| 3,562,883 | A | 2/1971 | Kobayashi |
| 3,571,878 | A | 3/1971 | Alderfer |
| 3,622,412 | A | 11/1971 | Ross |
| 3,637,416 | A | 1/1972 | Misch et al. |
| 3,646,652 | A | 3/1972 | Heiligenthal et al. |

(Continued)

FOREIGN PATENT DOCUMENTS

| | | |
|---|---|---|
| CA | 1 147 133 | 5/1983 |
| DE | 37 29 269 | 3/1988 |

(Continued)

OTHER PUBLICATIONS

International Search Report for PCT/US2004/007085.

(Continued)

*Primary Examiner* — Essama Omgba

(74) *Attorney, Agent, or Firm* — Myers Bigel, P.A.

(57) ABSTRACT

An industrial roll includes: a substantially cylindrical metallic core; a rubber base layer that is adhered to and circumferentially overlies the core; a rubber top stock layer that circumferentially overlies the base layer; and a polyurethane coating that circumferentially overlies the top stock layer. In this configuration, the roll can provide improved abrasion-resistance, sheet release properties, and/or toughness compared to a roll with a rubber cover, but may provide these properties in a cover that is softer than a typical polyurethane cover.

19 Claims, 4 Drawing Sheets

(56) References Cited

U.S. PATENT DOCUMENTS

| | | | | |
|---|---|---|---|---|
| 3,673,025 | A | | 6/1972 | Fukuyama et al. |
| 3,711,913 | A | | 1/1973 | Galeone et al. |
| 3,730,794 | A | | 5/1973 | Ross |
| 3,800,381 | A | | 4/1974 | Brafford |
| 3,852,862 | A | | 12/1974 | Sukenik |
| 3,877,919 | A | | 4/1975 | Shorr |
| 3,962,911 | A | | 6/1976 | Grenlund |
| 4,007,680 | A | | 2/1977 | Pfleger et al. |
| 4,013,806 | A | * | 3/1977 | Volkert et al. ................ 427/517 |
| 4,016,756 | A | | 4/1977 | Kunkle |
| 4,038,731 | A | | 8/1977 | Hill |
| 4,064,313 | A | | 12/1977 | Takiguchi et al. |
| 4,178,664 | A | | 12/1979 | McLoughlin |
| 4,233,011 | A | | 11/1980 | Bolender et al. |
| 4,250,605 | A | | 2/1981 | Chapman |
| 4,258,089 | A | | 3/1981 | Anderson et al. |
| 4,283,821 | A | | 8/1981 | Paakkunainen |
| 4,288,058 | A | | 9/1981 | Inman |
| 4,309,803 | A | | 1/1982 | Blaszak |
| 4,317,265 | A | | 3/1982 | Chase et al. |
| 4,366,025 | A | | 12/1982 | Gordon, Jr. et al. |
| 4,368,568 | A | | 1/1983 | Watanabe |
| 4,475,275 | A | | 10/1984 | Edwards |
| 4,509,237 | A | | 4/1985 | Volz et al. |
| 4,551,894 | A | | 11/1985 | Beucker |
| 4,576,845 | A | | 3/1986 | Krotchko |
| 4,705,711 | A | | 11/1987 | Perma |
| 4,729,153 | A | | 3/1988 | Pav et al. |
| 4,760,232 | A | | 7/1988 | Smith |
| 4,788,779 | A | * | 12/1988 | Sparkes .......................... 34/117 |
| 4,829,931 | A | | 5/1989 | Mogi |
| 4,842,944 | A | | 6/1989 | Kuge et al. |
| 4,871,908 | A | | 10/1989 | Skuratovsky et al. |
| 4,887,340 | A | | 12/1989 | Kato et al. |
| 4,898,012 | A | | 2/1990 | Jones et al. |
| 4,903,597 | A | | 2/1990 | Hoage et al. |
| 4,910,985 | A | | 3/1990 | Ballyns |
| 4,938,045 | A | | 7/1990 | Rosenstock et al. |
| 4,998,333 | A | | 3/1991 | Skytta |
| 5,014,406 | A | | 5/1991 | Kato et al. |
| 5,023,985 | A | | 6/1991 | Salo et al. |
| 5,048,353 | A | | 9/1991 | Justus |
| 5,084,139 | A | * | 1/1992 | Autio ......................... 162/360.3 |
| 5,091,027 | A | | 2/1992 | Watanabe |
| 5,138,766 | A | | 8/1992 | Kimura et al. |
| 5,167,068 | A | | 12/1992 | Leino et al. |
| 5,217,532 | A | | 6/1993 | Sasame et al. |
| 5,235,747 | A | | 8/1993 | Leino et al. |
| 5,253,027 | A | | 10/1993 | Goto |
| 5,294,909 | A | | 3/1994 | Frazier |
| 5,301,610 | A | | 4/1994 | McConnell |
| 5,376,448 | A | | 12/1994 | Suzuki et al. |
| 5,379,652 | A | | 1/1995 | Allonen |
| 5,383,371 | A | | 1/1995 | Laitinen |
| 5,403,995 | A | | 4/1995 | Kishino et al. |
| 5,412,870 | A | | 5/1995 | Lehtonen |
| 5,415,612 | A | | 5/1995 | Carlson et al. |
| 5,435,054 | A | | 7/1995 | Tonder et al. |
| 5,466,343 | A | | 11/1995 | Kankaanpaa |
| 5,505,492 | A | | 4/1996 | Nelson et al. |
| 5,520,600 | A | | 5/1996 | Fukumoto |
| 5,541,001 | A | | 7/1996 | Vreeland et al. |
| 5,553,381 | A | | 9/1996 | Lehtonen |
| 5,555,932 | A | | 9/1996 | Dudley |
| 5,562,027 | A | | 10/1996 | Moore |
| 5,601,920 | A | | 2/1997 | Paasonen et al. |
| 5,684,912 | A | | 11/1997 | Slaney et al. |
| 5,709,765 | A | | 1/1998 | Herbert et al. |
| 5,742,880 | A | | 4/1998 | Takenaka et al. |
| 5,759,355 | A | * | 6/1998 | Hirsimaki .................. 162/360.3 |
| 5,761,801 | A | | 6/1998 | Gebhardt et al. |
| 5,763,068 | A | | 6/1998 | Kishino et al. |
| 5,780,131 | A | | 7/1998 | Paasonen et al. |
| 5,797,322 | A | | 8/1998 | Lorig et al. |
| 5,851,352 | A | * | 12/1998 | Vinson et al. ................ 162/112 |
| 5,857,950 | A | | 1/1999 | Hycner |
| 5,860,360 | A | | 1/1999 | Lane, III et al. |
| 5,887,517 | A | | 3/1999 | Liang et al. |
| 5,895,689 | A | * | 4/1999 | Gajewski ...................... 427/425 |
| 5,915,648 | A | | 6/1999 | Madrzak et al. |
| 5,925,220 | A | | 7/1999 | Hirsch et al. |
| 5,983,799 | A | | 11/1999 | Lane, III et al. |
| 5,984,849 | A | | 11/1999 | Ohki et al. |
| 5,994,466 | A | * | 11/1999 | Yang ............................ 525/130 |
| 6,080,258 | A | | 6/2000 | Tittgemeyer |
| 6,159,134 | A | | 12/2000 | Sekar |
| 6,231,711 | B1 | | 5/2001 | Roberts et al. |
| 6,257,140 | B1 | | 7/2001 | Palmatier et al. |
| 6,284,103 | B1 | | 9/2001 | Eng et al. |
| 6,328,681 | B1 | | 12/2001 | Stephens |
| 6,375,602 | B1 | | 4/2002 | Jones |
| 6,393,249 | B1 | * | 5/2002 | Aslam et al. ................. 399/333 |
| 6,409,645 | B1 | * | 6/2002 | Paasonen et al. .............. 492/56 |
| 6,539,999 | B2 | | 4/2003 | Polzin et al. |
| 6,615,721 | B1 | | 9/2003 | Vrotacoe et al. |
| 6,874,232 | B2 | * | 4/2005 | Madden et al. ......... 29/895.211 |
| 7,014,604 | B2 | * | 3/2006 | Vergara ........................... 492/56 |
| 7,070,551 | B2 | * | 7/2006 | Lasson ............................ 492/56 |
| 7,261,680 | B2 | * | 8/2007 | Lutz ................................ 492/58 |
| 7,284,649 | B2 | * | 10/2007 | Shiraki et al. .............. 193/35 R |
| 2002/0086782 | A1 | * | 7/2002 | Borger et al. ................... 492/56 |
| 2003/0224917 | A1 | * | 12/2003 | Lutz ................................ 492/58 |
| 2004/0014573 | A1 | * | 1/2004 | Vergara ........................... 492/48 |
| 2004/0087754 | A1 | * | 5/2004 | Foley ................... C08G 18/664 528/59 |
| 2004/0205967 | A1 | * | 10/2004 | Barnes et al. ............. 29/895.32 |
| 2004/0235630 | A1 | * | 11/2004 | Madden et al. ................ 492/56 |
| 2006/0248723 | A1 | * | 11/2006 | Gustafson .................. 29/895.32 |

FOREIGN PATENT DOCUMENTS

| | | | | | |
|---|---|---|---|---|---|
| DE | 4007141 | | | 4/1991 | |
| DE | 199 20 133 | | | 11/2000 | |
| EP | 0 735 287 | A1 | | 10/1996 | |
| EP | 0 970 797 | | | 1/2000 | |
| EP | 1783270 | A1 | * | 5/2007 | ............... D21F 3/08 |
| JP | 59 076212 | | | 5/1984 | |
| JP | 61-171913 | | | 8/1986 | |
| JP | 61-258794 | | | 11/1986 | |
| JP | 2-41487 | | | 2/1990 | |
| JP | 2-259186 | | | 10/1990 | |
| JP | 5-106189 | | | 4/1993 | |
| JP | 6-58324 | | | 3/1994 | |
| JP | 09160354 | A | * | 6/1997 | ............. G03G 15/02 |
| JP | 2002206071 | A | * | 7/2002 | ........... C09D 175/14 |
| JP | 2007186839 | A | * | 7/2007 | ............... D21G 9/00 |
| WO | WO 94/09208 | | | 4/1994 | |
| WO | WO 95/17298 | | | 6/1995 | |
| WO | WO 96/31342 | | | 10/1996 | |
| WO | WO 97/38162 | | | 10/1997 | |
| WO | WO 97/47460 | | | 12/1997 | |
| WO | WO 98/56984 | | | 12/1998 | |
| WO | WO 9856841 | A1 | * | 12/1998 | ............. C08G 18/10 |
| WO | WO 2000/43593 | | | 7/2000 | |
| WO | WO 01/53787 | | | 7/2001 | |
| WO | WO 2005/113891 | | | 12/2005 | |

OTHER PUBLICATIONS

Paasonen; *The Role of Composite Roll Covers in Soft and Super Calendering*, 46$^{th}$ Congress Annual ATIP, Grenoble, Oct. 20-22, 1993, pp. 1-13.

PCT International Search Report PCT/US03/18895.

Watanabe; *Method for Producing a Hardened Roller*, Japan Patent Office, Patent Announcement Hei 3-47359, Application SHO 62-335378, Dec. 30, 1987, Disclosure Announcement Hei 1-260092 Oct. 17, 1989.

European Search Report for European Patent No. 06023052.1 dated Mar. 14, 2007.

* cited by examiner

ABRASION-RESISTANT RUBBER ROLL COVER WITH POLYURETHANE COATING

FIELD OF THE INVENTION

The present invention relates generally to industrial rolls, and more particularly to covers for industrial rolls.

BACKGROUND OF THE INVENTION

Cylindrical rolls are utilized in a number of industrial applications, especially those relating to papermaking. Such rolls are typically employed in demanding environments in which they can be exposed to high dynamic loads and temperatures and aggressive or corrosive chemical agents. As an example, in a typical paper mill, rolls are used not only for transporting a fibrous web sheet between processing stations, but also, in the case of press section and calender rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a metallic core. By varying the polymer or elastomer employed in the cover, the cover designer can provide the roll with different performance characteristics as the papermaking application demands. Also, repair, regrinding or replacement of a cover over a metallic roll can be considerably less expensive than the replacement of an entire metallic roll.

In many instances, the roll cover will include at least two distinct layers: a base layer that overlies the core and provides a bond thereto; and a topstock layer that overlies and bonds to the base layer and serves the outer surface of the roll (some rolls will also include an intermediate "tie-in" layer sandwiched by the base and top stock layers). The layers for these materials are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. Also, in order to be economical, the cover should be abrasion- and wear-resistant.

Rubber rolls such as couch rolls, lumpbreaker rolls, forming rolls and press rolls are used in different sections as mentioned above (see, e.g., *Pulp and Paper Manufacture* (Vol. 7) in *Paper Machine Operations*, editors Michael J. Kocurek and Benjamin A. Thorpe (1991)) for a discussion of the locations of such rolls in a typical papermaking machine). Rubber rolls typically have excellent chemical, mechanical, physical properties and good abrasion resistance. Also, soft rubber compounds (i.e., between about 30 and 300 on the Pusey and Jones (P&J) scale) ordinarily have excellent dynamic properties under dynamic nip conditions. Polyurethane (PU) is also used to cover rolls for different sections of a papermaking machine. PU covers typically have excellent abrasion resistance, release and toughness compared to rubber, particularly in the hardness range of 4 to 70 P&J. However, PU tends to be expensive, and softer PU (P&J of about 70 to 200) typically has poor chemical resistance compared to rubber.

SUMMARY OF THE INVENTION

The present invention is directed to industrial rolls that include covers that can provide additional combinations of properties to the roll. As a first aspect, embodiments of the present invention are directed to an industrial roll comprising: a substantially cylindrical metallic core; a rubber base layer that is adhered to and circumferentially overlies the core; a rubber top stock layer that circumferentially overlies the base layer; and a polyurethane coating that circumferentially overlies the top stock layer. In this configuration, the roll can provide improved abrasion-resistance, sheet release properties, and/or toughness compared to a roll with a rubber cover, but may provide these properties in a cover that is softer than a typical polyurethane cover.

As a second aspect, embodiments of the present invention are directed to an industrial roll comprising: a substantially cylindrical metallic core; a rubber base layer that is adhered to and circumferentially overlies the core; a rubber top stock layer that circumferentially overlies the base layer; and a polyurethane coating that circumferentially overlies the top stock layer, the coating having a thickness of between about 0.05 and 0.25 inches and a hardness of between about 3 and 70 P&J.

As a third aspect, embodiments of the present invention are directed to an industrial roll comprising: a substantially cylindrical metallic core; a rubber base layer that is adhered to and circumferentially overlies the core; a rubber top stock layer that circumferentially overlies the base layer, the top stock layer having a hardness of between about 30 and 300 P&J; and a polyurethane coating that circumferentially-overlies the top stock layer, the coating having a thickness of between about 0.05 and 0.25 inches and a hardness of between about 3 and 70 P&J.

DETAILED DESCRIPTION OF EMBODIMENTS OF THE INVENTION

Figure 1:
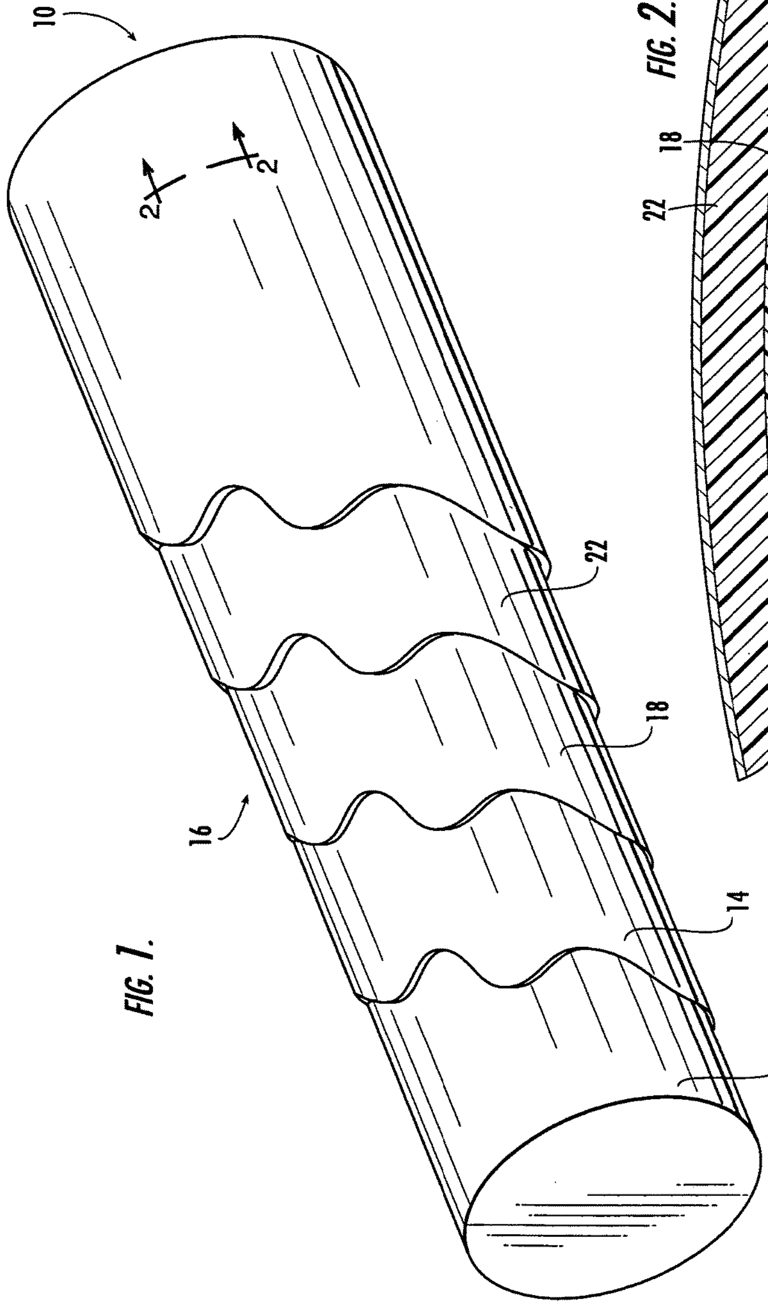
FIG. 1 is a perspective view of an industrial roll according to embodiments of the present invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity. Well-known functions or constructions may not be described in detail for brevity and/or clarity.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
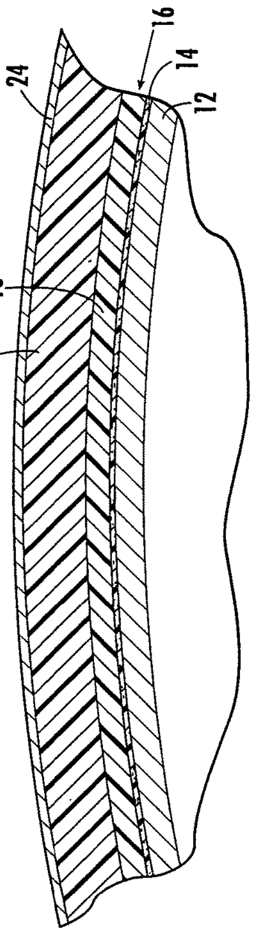
FIG. 2 is a greatly enlarged, partial section view of the roll of FIG. 1 taken along lines 2-2 thereof.

Referring now to the figures, a roll, designated broadly at 10, is illustrated in FIGS. 1 and 2. The roll 10 includes in overlying relationship a core 12 (typically metallic), an adhesive layer 14, and a cover 16. Each of these components is discussed in greater detail hereinbelow.

The core 12 is a substantially cylindrical, hollow structure typically formed of steel, some other metal, or even a composite material. The core 12 is typically between about 1.5 and 400 inches in length and 1 and 70 inches in diameter, with lengths between about 100 and 400 inches and diameters of between about 20 and 70 inches being common for papermaking purposes. At these more common length and diameter ranges, the core 12 typically has walls between about 1 and 5 inches in thickness. Components such as journals and bearings (not shown) are typically included on the core 12 to facilitate its mounting and rotation in a papermaking machine. The surface of the core 12 may be treated by blasting, sanding, sandblasting, or the like to prepare the surface for bonding to the adhesive layer 14.

Referring again to FIGS. 1 and 2, the adhesive layer 14 comprises an adhesive (typically an epoxy adhesive) that can attach the core 12 to the cover 16. Of course, the adhesive comprising the adhesive layer 14 should be chosen to be compatible with the materials of the core 12 and the base layer 18 of the cover 16 (i.e., it should provide a high-integrity bond between these structures without unduly harming either material); preferably, the bond has a tensile bond strength of between about 1,200 and 5,000 psi. The adhesive may have additives, such as curing agents, that facilitate curing and physical properties. Exemplary adhesives include Chemlok 220X and Chemlok 205, which are epoxy adhesives available from Lord Corporation, Raleigh, N.C.

The adhesive layer 14 can be applied to the core 12 in any manner known to be suitable to those skilled in this art for applying a thin layer of material. Exemplary application techniques include spraying, brushing, immersion, scraping, and the like. It is preferred that, if a solvent-based adhesive is used, the adhesive layer 14 be applied such that the solvent can evaporate prior to the application of the cover 16 in order to reduce the occurrence of trapped solvent that can cause "blows" during the curing process. Those skilled in this art will appreciate that the adhesive layer 14 may comprise multiple coats of adhesive, which may comprise different adhesives; for example, two different epoxy adhesives with slightly different properties may be employed. It should also be noted that, in some embodiments, the adhesive layer may be omitted entirely, such that the cover 16 is bonded directly to the core 12.

Still referring to FIGS. 1 and 2, the cover 16 comprises, in overlying relationship, a base layer 18, a top stock layer 22 and a coating 24. In the illustrated embodiment, the base layer 18 is adhered to the adhesive layer 14. The base layer 18 comprises a rubber compound that typically includes fillers and other additives. Exemplary rubber compounds include natural rubber and synthetic rubbers such as nitrile-butadiene rubber (NBR), hydrogenated nitrile-butadiene rubber (HNBR), an ethylene-propylene terpolymer formed of ethylene-propylene diene monomer (EPDM), chlorosulfonated polyethylene (CSM), styrene butadiene (SBR), chloroprene (CR) and blends and co-polymers thereof.

Fillers are typically added to the base layer 18 to modify the physical properties of the compound and/or to reduce its cost. Exemplary filler materials include inorganic oxides such as aluminum oxide ($Al_2O_3$), silicon dioxide ($SiO_2$), magnesium oxide (MgO), calcium oxide (CaO), zinc oxide (ZnO) and titanium dioxide ($TiO_2$), carbon black (also known as furnace black), silicates such as clays, talc, wollastonite ($CaSiO_3$), magnesium silicate ($MgSiO_3$), anhydrous aluminum silicate, and feldspar ($KAlSi_3O_8$), sulfates such as barium sulfate and calcium sulfate, metallic powders such as aluminum, iron, copper, stainless steel, or nickel, carbonates such as calcium carbonate ($CaCo_3$) and magnesium carbonate ($MgCo_3$), mica, silica (natural, fumed, hydrated, anhydrous or precipitated), and nitrides and carbides, such as silicon carbide (SiC) and aluminum nitride (AlN). These fillers may be present in virtually any form, such as powder, pellet, fiber or sphere.

Also, the base layer 18 may optionally include other additives, such as polymerization initiators, activators and accelerators, curing or vulcanizing agents, plasticizers, heat stabilizers, antioxidants and antiozonants, coupling agents, pigments, and the like, that can facilitate processing and enhance physical properties. These components are generally compounded into the polymer prior to the time of application of the base layer 18 to the adhesive layer 14 or directly to the core 12. Those skilled in this art will appreciate that the identity and amounts of these agents and their use in a base layer are generally known and need not be described in detail herein.

The base layer 18 can be applied by any manner known to those skilled in this art to be suitable for the application of polymers to an underlying surface. In some embodiments, the base layer 18 is applied through an extrusion process in which strips of the base layer 18 are extruded through an extrusion die, then, while still warm, are overlaid over the adhesive layer 14 as it is still somewhat tacky. The base layer strips are preferably between about 0.030 and 0.125 inches in thickness and are applied in an overlapping manner, with the result that total thickness of the base layer 18 is typically between about 0.0625 and 0.25 inches. Those skilled in this art will appreciate that, in some embodiments, the base layer 18 may be omitted such that the topstock layer 22 is adhered directly to the adhesive layer 14 or, in the absence of an adhesive layer, to the core 12.

Referring again to FIGS. 1 and 2, in the illustrated embodiment, the topstock layer 22 circumferentially overlies and, unless one or more tie-in layers are included as described below, is adhered to the base layer 18. The topstock layer 22 comprises a rubber compound, such as NBR, HNBR, EPDM, CSM, or natural rubber, that typically includes fillers and other additives.

Exemplary fillers include silicone dioxide, carbon black, clay, and titanium dioxide ($TiO_2$) as well as others set forth hereinabove in connection with the base layer 18. Typically, fillers are included in an amount of between about 3 and 70 percent by weight of the topstock layer 22. The fillers can take virtually any form, including powder, pellet, bead, fiber, sphere, or the like.

Exemplary additives include polymerization initiators, activators and accelerators, curing or vulcanizing agents, plasticizers, heat stabilizers, antioxidants, coupling agents, pigments, and the like, that can facilitate processing and enhance physical properties. Those skilled in this art will understand the types and concentrations of additives that are appropriate for inclusion in the topstock layer 22, so these need not be discussed in detail herein.

The top stock layer 22 can be applied over the base layer 18 by any technique known to those skilled in this art to be suitable for the application of elastomeric materials over a cylindrical surface. Preferably, the components of the topstock layer 22 are mixed separately, then blended in a mill. The blended material is transferred from the mill to an extruder, which extrudes feed strips of top stock material onto the base layer 18. Alternatively, either or both of the base and top stock layers 18, 22 can be applied through the overlaying of calendered sheets of material.

In some embodiments, the top stock layer 22 is applied such that it is between about 1 and 2.5 inches in thickness (at higher thickness, multiple passes of material may be required). It is also be suitable for the thickness of the top stock layer 22 be between about 50 and 90 percent of the total cover thickness (i.e. the total thickness of the combined base and top stock layers 18, 22 and coating 24). The rubber compounds of the base layer 18 and the top stock 22 may be selected such that the base layer 18 has a higher hardness value than the top stock layer 22. As an example, the base layer 18 may have a hardness of between about 1 and 100 P&J (in some embodiments, between 3 and 100 P&J, and in other embodiments, between 3 and 20 P&J), and the top stock layer 22 may have a hardness of between about 30 and 300 P&J (in some embodiments between 3 and 250 P&J). The graduated hardness concept can reduce the bond line shear stresses that can occur due to mismatches of the elastic properties (such as elastic modulus and Poisson's ratio) of the various layers in the cover constructions. This reduction in interface shear stress can be important in maintaining cover integrity.

Those skilled in this art will also appreciate that the roll 10 may be constructed with a tie-in layer sandwiched between the base layer 18 and the top stock layer 22, such that the tie-in layer would directly underlie the top stock layer 22. The typical properties of a tie-in layer are well-known to those skilled in this art and need not be described in detail herein.

After the top stock 22 has been applied, these layers of the cover 16 are then cured, typically in an autoclave, for a suitable curing period (generally between about 16 and 30 hours). After curing, it is preferred that any crust that has developed is skimmed from the surface of the top stock layer 22, and that the top stock layer 22 is ground for dimensional correctness.

Referring once again to FIGS. 1 and 2, the coating 24 is then applied over the top stock 22. The coating 24 comprises a polyurethane compound and can be any number of polyurethane compounds known to those skilled in this art to be suitable for use in papermaking machine rolls. Exemplary polyurethane compounds include those formed from cast and ribbon flow processes. In some embodiments, the polyurethane coating 24 is between about 0.050 and 0.200 inches in thickness. In certain embodiments, the polyurethane coating has a hardness of between about 3 and 70 P&J, and may have a hardness of between about 3 and 30 P&J.

The polyurethane of the coating 24 may have fillers and additives of the type described above in connection with the rubber compounds of the base and top stock layers 18, 22 that can modify or enhance its physical properties and manufacturing characteristics. Exemplary materials, additives and fillers are set forth in U.S. Pat. No. 4,224,372 to Romanski, U.S. Pat. No. 4,859,396 to Krenkel et al. and U.S. Pat. No. 4,978,428 to Cronin et al., the disclosures of each of which are hereby incorporated herein in their entireties.

The polyurethane coating 24 can be applied over the top stock 22 in any manner known to those skilled in this art to be suitable for the application of polyurethane, including extrusion, casting, spraying and the like. In some embodiments, extrusion of the coating 24 over the top stock 22 may be particularly suitable. In some cases, an adhesive layer may be applied to the top stock 22 prior to the application of the coating 24.

After application of the coating 24, the roll 10 is cured (typically via the application of heat), and may be ground and/or otherwise finished in a manner known to those skilled in this art.

Figure 3:
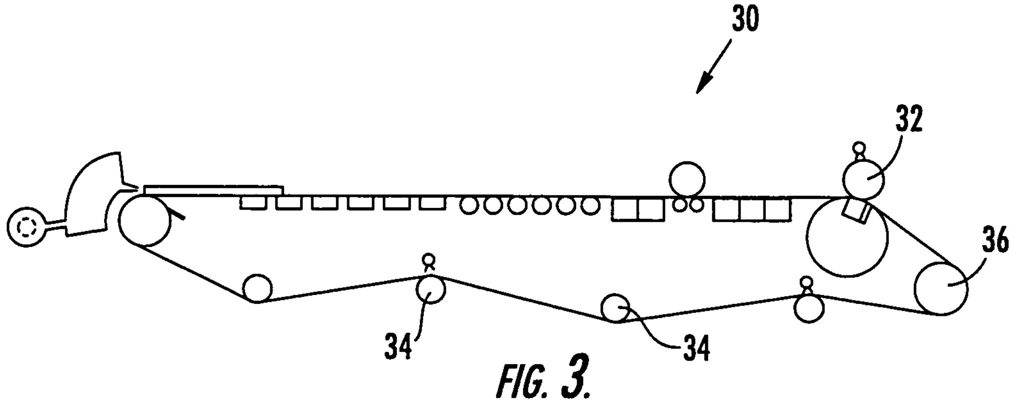
FIG. 3 is a schematic diagram of the forming section of a Fourdrinier papermaking machine and rolls according to embodiments of the present invention employed therein.
Figure 4:
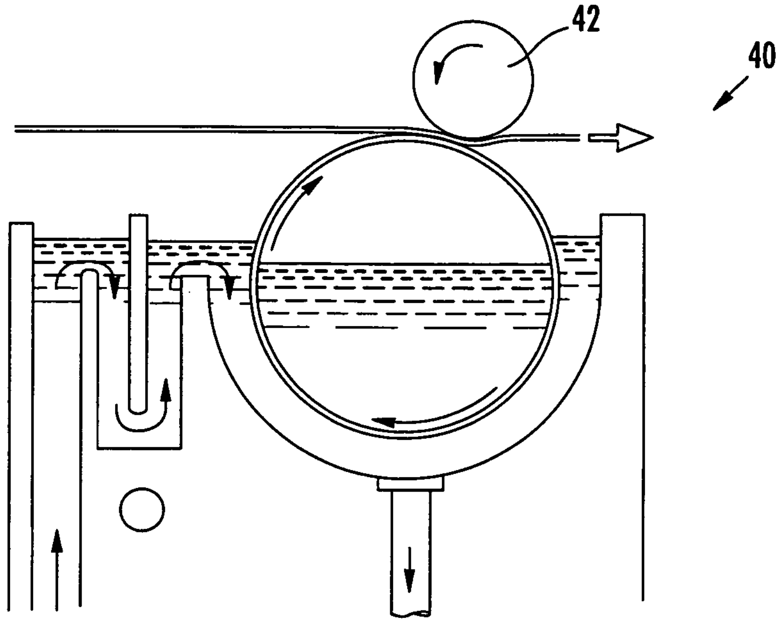
FIG. 4 is a schematic diagram of a cylinder couch roll according to embodiments of the present invention employed in a vat-based papermaking machine.
Figure 5:
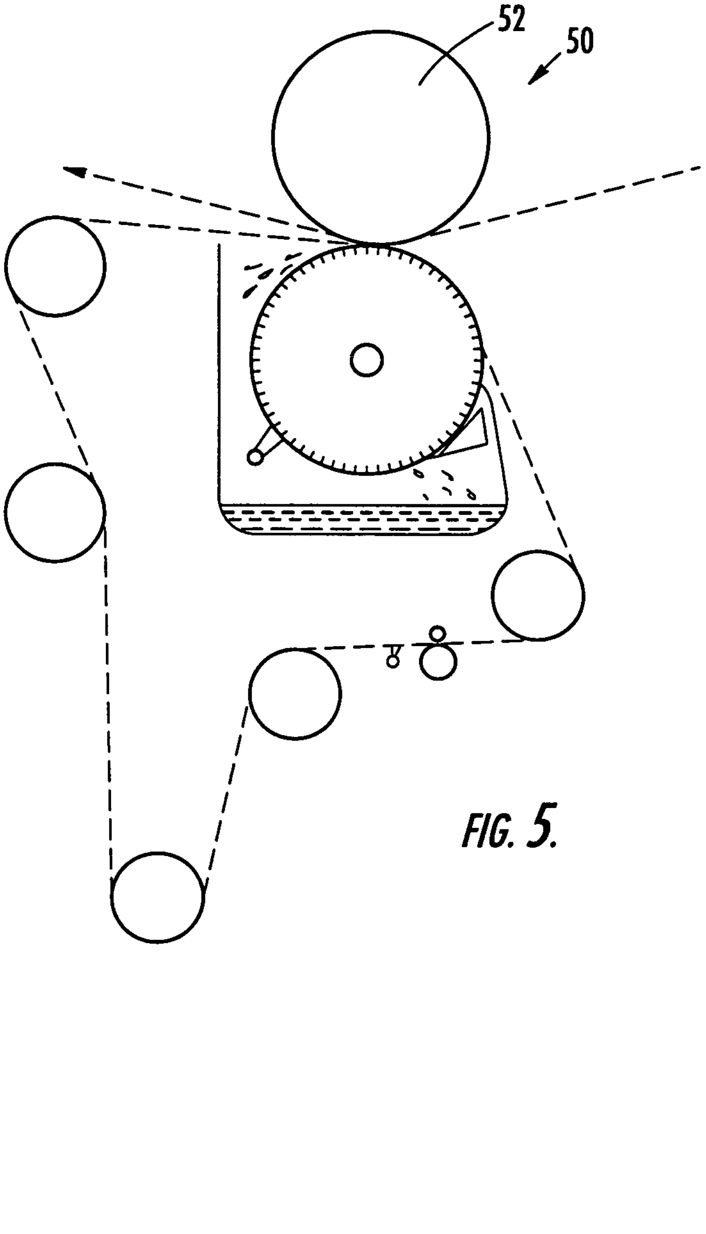
FIG. 5 is a schematic diagram of a press section of a papermaking machine and rolls according to embodiments of the present invention employed therein.

Roll covers formed with a polyurethane coating over a rubber base and top stock may possess advantageous properties of both polymers, thereby providing a roll cover with improved performance characteristics. For example, rolls with covers as described may have improved abrasion-resistance, sheet release properties, and/or toughness compared to a roll with a rubber cover, but may provide these properties in a cover that is softer than a typical polyurethane cover. As such, within a Fourdrinier papermaking machine 30, these rolls may be particularly suitable in a lumpbreaker roll 32 or in other forming rolls 34 (see FIG. 3). In a vat-based papermaking machine 40, rolls according to embodiments of the present invention may be suitable for use in cylinder couch rolls 42 (see FIG. 4). A press section 50 of a papermaking machine may employ press rolls 52 according to embodiments of the present invention (FIG. 5).

Alternatively, the polyurethane coating may be employed with a "bone-hard" rubber roll to provide a softer surface that may enhance sheet release and/or frictional engagement of the roll with the sheet. For example, a wire drive roll 36 of the papermaking machine 30 (FIG. 3) may be constructed according to embodiments of the present invention.

Figure 6:
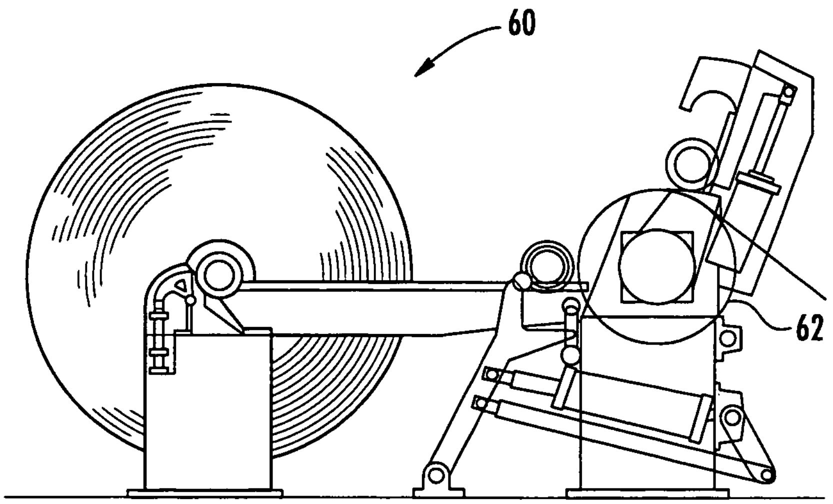
FIG. 6 is a schematic diagram of a reel of a papermaking operation and a reel drum employed therewith according to embodiments of the present invention employed therein.
Figure 7:
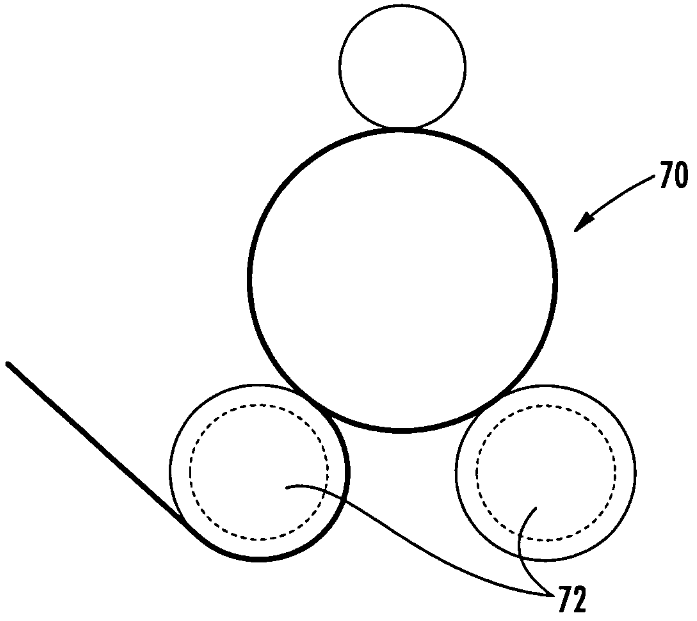
FIG. 7 is a schematic diagram of a winder of a papermaking operation and winder drums employed therewith according to embodiments of the present invention employed therein.

In addition, rolls made according to embodiments of the present invention may be employed in reel drums (see reel drum 62 in reel 60 in FIG. 6), winder drums (see winder drums 72 of winder 70 in FIG. 7), and in other rolls and drums employed in papermaking.

Exemplary combinations of material, thickness and hardness for different roll positions in a papermaking machine are set forth below in Table 1.

TABLE 1

| Roll Type | Rubber Base Layer Thickness (in.) | Rubber Base Layer Hardness (P&J) | Rubber Top Stock Thickness (in.) | Rubber Top Stock Hardness (P&J) | Polyurethane Coating Thickness (in.) | Polyurethane Coating Hardness (P&J) |
|---|---|---|---|---|---|---|
| Press | 0.125-0.25 | 1-15 | 1.125-1.0 | 10-120 | 0.05-0.25 | 3-70 |
| Lumpbreaker | 0.125-0.25 | 10-100 | 1.50-2.00 | 170-230 | 0.05-0.25 | 7-70 |
| Couch | 0.125-0.25 | 10-100 | 1.50-2.00 | 170-250 | 0.05-0.25 | 7-70 |
| Winder and Reel Drums | 0.125-0.25 | 3-15 | 0.25-0.875 | 30-120 | 0.05-0.25 | 7-70 |
| Felt and wire rolls | 0.125-0.25 | 0-3 | 0.25-0.875 | 0-35 | 0.05-0.25 | 3-30 |

Those skilled in this art will appreciate that other combinations of thickness and hardness may be employed for any of the layers set forth above depending on the circumstances of the particular papermaking machine and the position of the roll within the machine.

In addition, those skilled in this art will appreciate that rolls of the present invention may be employed in environments other than papermaking machines, including sleeves, paper carry rolls, and the like.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An industrial roll, comprising:
- a substantially cylindrical metallic core;
- a rubber base layer that is adhered to and circumferentially overlies the core;
- a rubber top stock layer that circumferentially overlies the base layer, wherein the top stock layer has a hardness of between about 30 and 300 P&J; and
- a polyurethane coating that circumferentially overlies the top stock layer, wherein the coating has a hardness of between about 3 and 30 P&J; and
- wherein the thickness of the coating is between about 0.05 and 0.25 inches.

2. The industrial roll defined in claim 1, wherein the rubber of the base layer is selected from the group consisting of: natural rubber; NBR; HNBR; EDPM; CR; SBR; and CSM.

3. The industrial roll defined in claim 1, wherein the thickness of the base layer is between about 0.0625 and 0.25 inches.

4. The industrial roll defined in claim 1, wherein the base layer has a hardness of between 3 and 20 P&J.

5. The industrial roll defined in claim 1, further comprising a rubber tie-layer between the base layer and the top stock layer.

6. The industrial roll defined in claim 1, wherein the thickness of the top stock layer is between about 1 and 2.5 inches.

7. The industrial roll defined in claim 1, positioned in a couch roll position in papermaking machine.

8. The industrial roll defined in claim 1, positioned in a press roll position in papermaking machine.

9. The industrial roll defined in claim 1, positioned in a forming roll position in papermaking machine.

10. The industrial roll defined in claim 1, positioned in a lumpbreaker roll position in papermaking machine.

11. An industrial roll, comprising:
- a substantially cylindrical metallic core;
- a rubber base layer that is adhered to and circumferentially overlies the core;
- a rubber top stock layer that circumferentially overlies the base layer; and
- a polyurethane coating that circumferentially overlies the top stock layer, the coating having a thickness of between about 0.05 and 0.25 inches and a hardness of between about 3 and 70 P&J.

12. An industrial roll, comprising:
- a substantially cylindrical metallic core;
- a rubber base layer that is adhered to and circumferentially overlies the core;
- a rubber top stock layer that circumferentially overlies the base layer, the top stock layer having a hardness of between about 30 and 300 P&J; and
- a polyurethane coating that circumferentially overlies the top stock layer, the coating having a thickness of between about 0.05 and 0.25 inches and a hardness of between about 3 and 70 P&J.

13. An industrial roll, comprising:
- a substantially cylindrical metallic core;
- a rubber base layer that is adhered to and circumferentially overlies the core;
- a rubber top stock layer that circumferentially overlies the base layer, wherein the top stock layer has a hardness that is lower than a hardness of the base layer; and
- a polyurethane coating that circumferentially overlies the top stock layer;
- wherein the coating has a hardness of between about 3 and 70 P&J.

14. The industrial roll defined in claim 13, wherein the rubber of the base layer is selected from the group consisting of: natural rubber; NBR; HNBR; EDPM; CR; SBR; and CSM.

15. The industrial roll defined in claim 13, wherein the thickness of the base layer is between about 0.0625 and 0.25 inches.

16. The industrial roll defined in claim 13, wherein the base layer has a hardness of between 3 and 20 P&J.

17. The industrial roll defined in claim 13, further comprising a rubber tie-layer between the base layer and the top stock layer.

18. The industrial roll defined in claim 13, wherein the thickness of the top stock layer is between about 1 and 2.5 inches.

19. The industrial roll defined in claim 13, positioned in a papermaking machine in one of: a couch roll; a press roll; a forming roll; and a lumpbreaker roll.

* * * * *